(12) United States Patent
Li

(10) Patent No.: US 10,218,570 B2
(45) Date of Patent: Feb. 26, 2019

(54) CLIENT APPLICATION ADAPTATION METHOD, TERMINAL DEVICE, AND SYSTEM

(71) Applicant: Tencent Technology (Shenzhen) Company Limited, Shenzhen (CN)

(72) Inventor: Yanchao Li, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 232 days.

(21) Appl. No.: 15/218,523

(22) Filed: Jul. 25, 2016

(65) Prior Publication Data

US 2016/0337191 A1 Nov. 17, 2016

Related U.S. Application Data

(63) Continuation of application No. PCT/CN2015/080634, filed on Jun. 3, 2015.

(30) Foreign Application Priority Data

Jun. 5, 2014 (CN) .......................... 2014 1 0248185

(51) Int. Cl.
| | | |
|---|---|---|
| G06F 15/177 | (2006.01) | |
| H04L 12/24 | (2006.01) | |
| H04W 24/02 | (2009.01) | |
| G06F 17/30 | (2006.01) | |
| H04B 1/3827 | (2015.01) | |

(Continued)

(52) U.S. Cl.
CPC .... *H04L 41/0816* (2013.01); *G06F 17/30864* (2013.01); *H04B 1/3827* (2013.01); *H04L 67/10* (2013.01); *H04L 67/42* (2013.01); *H04W 24/02* (2013.01)

(58) Field of Classification Search
CPC ..... H04L 41/0816; H04L 67/10; H04L 67/42; H04B 1/3827; G06F 17/30864; H04W 24/02
USPC .................................................. 709/221, 203
See application file for complete search history.

(56) References Cited

FOREIGN PATENT DOCUMENTS

| CN | 101202755 A | 6/2008 |
| CN | 101661735 * | 3/2010 |
| CN | 101661735 A | 3/2010 |

(Continued)

OTHER PUBLICATIONS

International Search Report issued in corresponding International Application No. PCT/CN2015/080634, dated Sep. 2, 2015 (2 pages).

(Continued)

*Primary Examiner* — Frantz B Jean
(74) *Attorney, Agent, or Firm* — Bookoff McAndrews, PLLC

(57) ABSTRACT

A client application adaptation method, terminal device, and system are described, where the method may obtain model identifier information of the terminal device, and send the model identifier information to an adaptation server, so that the adaptation server searches a preset model adaptation database for corresponding model adaptation information according to the model identifier information. The method also receives the model adaptation information returned by the adaptation server, and performs adaptation on a client application in the terminal device according to the model adaptation information.

6 Claims, 3 Drawing Sheets

(51) Int. Cl.
*H04L 29/08* (2006.01)
*H04L 29/06* (2006.01)

(56) References Cited

FOREIGN PATENT DOCUMENTS

| | | | |
|---|---|---|---|
| CN | 102307228 A | | 1/2012 |
| CN | 102810066 A | | 12/2012 |
| CN | 103546907 | * | 1/2014 |
| CN | 103546907 A | | 1/2014 |
| CN | 103678096 A | | 3/2014 |
| WO | WO 2011011534 A1 | | 1/2011 |

OTHER PUBLICATIONS

International Preliminary Report on Patentability issued in corresponding International Application No. PCT/CN2015/080634, dated Dec. 6, 2016 (4 pages).

* cited by examiner

CLIENT APPLICATION ADAPTATION METHOD, TERMINAL DEVICE, AND SYSTEM

CROSS REFERENCE TO RELATED APPLICATIONS

This application is a continuation application of PCT Patent Application No. PCT/CN2015/080634, filed on Jun. 3, 2015, which claims priority to Chinese Patent Application No. 201410248185.8, filed on Jun. 5, 2014, both of which are incorporated by reference in their entirety.

FIELD OF THE TECHNOLOGY

The present disclosure relates to the field of Internet technologies, and to a client application adaptation method, terminal device, and system.

BACKGROUND OF THE DISCLOSURE

With rapid development of Internet technologies and particularly the mobile Internet, an increasing quantity of applications (APPs) are used on mobile terminals; however, there are a great variety of software and hardware characteristics of a mobile terminal device, for example, for merely mobile terminals that run an Android intelligent mobile phone system, there are various models produced by various manufacturers, and their device hardware differs in thousands of ways. Therefore, in a development process of a mobile APP application, an adaptation test in a real environment must be performed by using a large quantity of different mobile phones, before the mobile APP application can be commercially used. In a process of an existing adaptation test, an application generally obtains, by using an application programming interface (API), adaptation information of a terminal device in which the application is located; however, a system API may be tampered with or incorrect. For example, any person may modify and improve an Android system without infringing upon integrity of the system. Therefore, a case often exists in which adaptation information obtained from the API is incorrect, causing the application adaptation test to go wrong.

SUMMARY

Embodiments of the present disclosure provide a client application adaptation method, terminal device, and system, which can perform adaptation, according to real model adaptation information of a terminal device, on a client application in the terminal device, thereby improving reliability of client application adaptation.

An embodiment of the present application provides a client application adaptation method. The method may include: obtaining, by a terminal device, model identifier information of the terminal device; sending, by the terminal device, the model identifier information to an adaptation server, so that the adaptation server searches a preset model adaptation database for corresponding model adaptation information according to the model identifier information; receiving, by the terminal device, model adaptation information returned by the adaptation server; and performing, by the terminal device, adaptation on a client application in the terminal device according to the model adaptation information returned by the adaptation server.

Accordingly, an embodiment of the present disclosure further provides a terminal device. The terminal device includes: a model identifier obtaining module to obtain model identifier information of the terminal device; a model identifier reporting module to send the model identifier information to an adaptation server, so that the adaptation server searches a preset model adaptation database for corresponding model adaptation information according to the model identifier information; an adaptation information obtaining module to receive model adaptation information returned by the adaptation server; and an adaptation module to perform adaptation on a client application in the terminal device according to the model adaptation information returned by the adaptation server.

In addition, an embodiment of the present disclosure further provides a client application adaptation system. The system includes an adaptation server and at least one terminal device. The terminal device obtains model identifier information of the terminal device, and sends the model identifier information to the adaptation server. The adaptation server searches a preset model adaptation database for corresponding model adaptation information according to the model identifier information, and returns the model adaptation information to the terminal device. The terminal device further performs adaptation on a client application in the terminal device according to the model adaptation information returned by the adaptation server.

A terminal device obtains model identifier information of the terminal device, and sends the model identifier information to an adaptation server, so that the adaptation server searches a preset model adaptation database for corresponding model adaptation information according to the model identifier information; and further the terminal device receives the real model adaptation information of the terminal device returned by the adaptation server, and performs adaptation on a client application in the terminal device according to the real model adaptation information of the terminal device returned by the adaptation server, thereby improving reliability of client application adaptation.

BRIEF DESCRIPTION OF THE DRAWINGS

To describe technical methods in embodiments of the present disclosure or in the traditional art more clearly, the following briefly introduces accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical methods in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure provide a client application adaptation method, which can send model identifier information of a terminal device to an adaptation server, where the model identifier information of the terminal device may include information such as a brand identifier and model identifier, where the brand identifier may include Samsung™, Apple™, Xiaomi™, Coolpad™, or the like, and the model identifier may include GT-i8552, iPhone 5S, Xiaomi phone 3, Coolpad 7260, or the like. In the existing technology, adaptation information of a terminal device in which a client application is located is generally obtained by using an API; however a system API may be tampered with or incorrect, causing client application adaptation to go wrong. The adaptation server in the embodiments may search a preset model adaptation database for corresponding model adaptation information according to the model identifier information, where the model adaptation information may include information such as hardware status and a system support parameter of a terminal device corresponding to the model identifier information. Further, adaption may be performed on the client application according to the real model adaptation information of the terminal device in which the client application is located, which is returned by the adaptation server, thereby improving reliability of the client application adaptation. In the embodiments, the client application refers to an application that runs in the terminal device.

Figure 1:
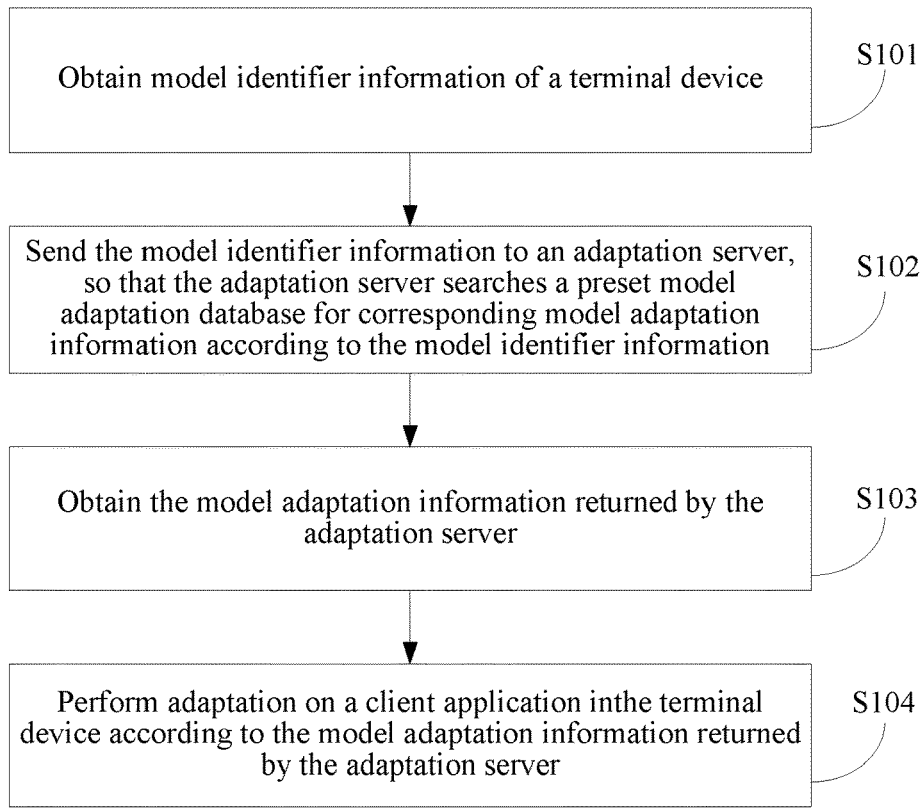
FIG. 1 is a flowchart of a client application adaptation method according to various embodiments of the present disclosure.

Referring to FIG. 1, FIG. 1 is a flowchart of a client application adaptation method according to various embodiments of the present disclosure. The method may include:

Step S101: Obtain model identifier information of a terminal device.

The model identifier information of the terminal device may include information such as a brand identifier and model identifier, where the brand identifier may include Samsung™, Apple™, Xiaomi™, Coolpad™, or the like, and the model identifier may include GT-i8552, iPhone 5S, Xiaomi phone 3, Coolpad 7260, or the like. In various embodiments, configuration information of the terminal device may be invoked, and the model identifier information of the terminal device may be obtained from the configuration information; or the model identifier information of the terminal device may be obtained according to a link address of the terminal device, or the model identifier information of the terminal device may be obtained in another implementation manner, which specifically is not limited by various embodiments of the present disclosure.

Step S102: Send the model identifier information to an adaptation server, so that the adaptation server searches a preset model adaptation database for corresponding model adaptation information according to the model identifier information.

The adaptation server may store model identifier information of terminal devices and model adaptation information corresponding to the model identifier information that is collected in advance into the preset model adaptation database. Specifically, a developer may perform the collection for real devices in advance, that is, collect model identifier information of the real devices and model adaptation information corresponding to the model identifier information in advance; the adaptation server may correspondingly store the model identifier information and the model adaptation information that are collected by the developer in advance into the preset model adaptation database; and then after a terminal device sends the model identifier information to the adaptation server, the adaptation server may search the preset model adaptation database for the model adaptation information corresponding to the received model identifier information, where the model adaptation information may include real information such as hardware status and a system support parameter of the terminal device corresponding to the received model identifier information, where the hardware status of the terminal device may include information about a display screen, a camera, a microphone, a receiver, or the like, and the system support parameter of the terminal device may include information such as a network mode, an operating system, a video display format, or a display screen resolution. In one embodiment, the developer is a person who programs computers or designs the system to match requirements of a systems analyst.

Step S103: Obtain the model adaptation information returned by the adaptation server.

In various embodiments, the real model adaptation information of the terminal device in which the client application is located, which is returned by the adaptation server, may be obtained. For example, if the received model identifier information of the terminal device is Xiaomi phone 3, after the model identifier information is sent to the adaptation server, the adaptation server searches the preset model adaptation database for model adaptation information corresponding to the model identifier information, where the model adaptation information may include information such as dual cameras (a front-facing camera and a rear-facing camera), an operating system MIUI, a display screen 5.0-inch, and a video display format 1080P (which is the highest-level high-definition digital television format standard formulated by the Society of Motion Picture and Television Engineers), and then the model adaptation information returned by the adaptation server is obtained.

Step S104: Perform adaptation on a client application in the terminal device according to the model adaptation information returned by the adaptation server.

For example, the adaptation may be performed on the client application in the terminal device according to the real model adaptation information of the terminal device in which the client application is located, which is returned by the adaptation server. For example, in a development process of an APP application, an adaptation test in a real environment is performed by using different types of terminal devices, or before a target terminal device is installed or the APP application is used, client application adaptation is performed according to real model adaptation information of the target terminal device which is returned by the adaptation server.

Specifically, the terminal device may execute a preset logic function according to the model adaptation information returned by the adaptation server, where the preset logic function may include a video chat application, an image and video application, a game voice application, and the like, and further the model adaptation information may include multiple pieces of device information of the terminal device in which the client application is located, for example, camera information, video display format information, microphone information, and receiver information, and may obtain, according to a target logic function, at least one piece of device information corresponding to the target logic function from the model adaptation information obtained by the adaptation server, and execute the target logic function according to the at least one piece of device information corresponding to the target logic function.

In various embodiments, an adaptation developer may run multiple preset target logic functions in the terminal device according to the model adaptation information, thereby obtaining an adaptation test result of a program for the preset target logic functions in a terminal device in which the program is currently located. For example, if the obtained model identifier information of the terminal device is Xiaomi phone 3, and the model identifier information is sent to the adaptation server, the adaptation server may search the preset model adaptation database for corresponding model adaptation information according to the model identifier information, and the model adaptation information returned by the adaptation server is received. If the target logic function is a video chat application, at least one piece of device information corresponding to the video chat application may be obtained from the model adaptation information returned by the adaptation server, where the device information may include camera information, video display format information, microphone information, receiver information, and the like, the video chat application is run according to the device information, and an adaptation test result of a program for the video chat application in a terminal device in which the program is currently located is obtained.

However, in various embodiments, the foregoing procedure may also be executed in an installation process of a client application, to implement adaption of the client application in a terminal device in which the client application is currently located, to ensure that, when being used, the client application uses real model adaptation information of the terminal device in a process of executing a target logic function. For example, if, in the installation process of the client application, the obtained model identifier information of the terminal device in which the client application is located is Xiaomi phone 3, and the model identifier information is sent to the adaptation server, the adaptation server may search the preset model adaptation database for corresponding model adaptation information according to the model identifier information, and the real model adaptation information of the terminal device in which the client application is located, which is returned by the adaptation server, is received. If the target logic function executed by the client application when the target logic function is being used is a video chat application, the client application may obtain at least one piece of device information corresponding to the video chat application from the real model adaptation information of the terminal device returned by the adaptation server, where the device information may include camera information, video display format information, microphone information, receiver information, and the like, and the client application may run the video chat application according to the device information, to implement adaptation of the client application in a terminal device in which the client application is currently located.

In the client application adaptation method shown in FIG. 1, a terminal device sends obtained model identifier information of the terminal device to an adaptation server, so that the adaptation server searches a preset model adaptation database for corresponding model adaptation information according to the model identifier information, the terminal device receives the model adaptation information returned by the adaptation server, and performs adaptation, according to the real model adaptation information of the terminal device in which a client application is located, which is returned by the adaptation server, on the client application, thereby improving reliability of client application adaptation.

Figure 2:
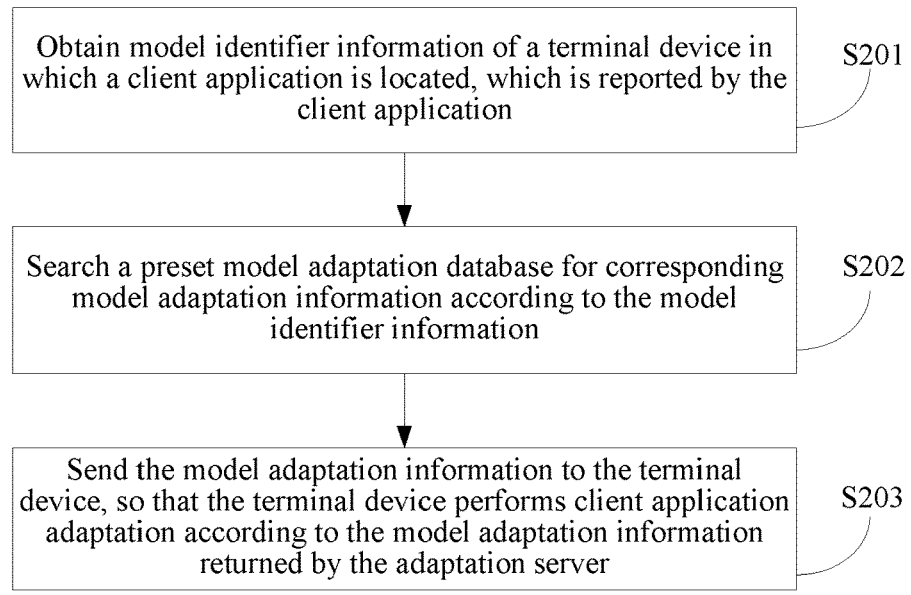
FIG. 2 is a flowchart of a client application adaptation method according to various embodiments of the present disclosure.

Referring to FIG. 2, FIG. 2 is a flowchart of a client application adaptation method according to various embodiments of the present disclosure. The method may include:

Step S201: Obtain model identifier information of a terminal device in which a client application is located, which is reported by the client application.

An adaptation server may obtain the model identifier information of the terminal device in which the client application is located, which is reported by the client application. The model identifier information of the terminal device may include information such as a brand identifier and model identifier, where the brand identifier may include Samsung™, Apple™, Xiaomi™, Coolpad™, or the like, and the model identifier may include GT-i8552, iPhone 5S, Xiaomi phone 3, Coolpad 7260, or the like. The client application may invoke configuration information of the terminal device in which the client application is located, and obtain the model identifier information of the terminal device from the configuration information; or the client application may obtain the model identifier information of the terminal device according to a link address of the terminal device in which the client application is located; or the client application may obtain the model identifier information of the terminal device in which the client application is located in another implementation manner, which specifically is not limited by various embodiments of the present disclosure. Further, the adaptation server may obtain the model identifier information of the terminal device in which the client application is located, which is reported by the client application.

Step S202: Search a preset model adaptation database for corresponding model adaptation information according to the model identifier information.

After obtaining the model identifier information reported by the client application, the adaptation server may search the preset model adaptation database for the corresponding model adaptation information according to the model identifier information.

The adaptation server may store model identifier information of terminal devices and model adaptation information corresponding to the model identifier information that are collected in advance into the preset model adaptation database. Specifically, a developer may perform the collection for real devices in advance, that is, collect model identifier information of the real devices and model adaptation information corresponding to the model identifier information in advance; the adaptation server may correspondingly store the model identifier information and the model adaptation information that are collected by the developer in advance into the preset model adaptation database; and then the adaptation server may search the preset model adaptation database for the corresponding model adaptation information according to the model identifier information, where the model adaptation information may include information such as hardware status and a system support parameter of the terminal device corresponding to the received model identifier information, where the hardware status of the terminal device may include information about a display screen, a camera, a microphone, a receiver, or the like, and the system support parameter of the terminal device may include information such as a network mode, an operating system, a video display format, or a display screen resolution.

Step S203: Send the model adaptation information to the terminal device, so that the terminal device performs adaptation on the client application in the terminal device according to the model adaptation information returned by the adaptation server.

The adaptation server may send the found model adaptation information to the terminal device, so that the terminal device performs client application adaptation according to the real model adaptation information of the terminal device in which the client application is located, which is returned by the adaptation server. For example, if the model identifier information of the terminal device is Xiaomi phone 3, the adaptation server searches the preset model adaptation database for model adaptation information corresponding to the model identifier information, where the model adaptation information may include information such as dual cameras, an operating system MIUI, a display screen 5.0-inch, and a video display format 1080P; and the adaptation server may send the found model adaptation information to the terminal device, so that the terminal device performs client application adaptation according to the model adaptation information returned by the adaptation server.

Specifically, the adaptation server sends the found model adaptation information to the terminal device, so that the terminal device may execute a preset logic function according to the model adaptation information returned by the adaptation server, where the preset logic function may include a video chat application, an image and video application, a game voice application, and the like, and further the model adaptation information may include multiple pieces of device information of the terminal device in which the client application is located, for example, camera information, video display format information, microphone information, and receiver information, and execute a target logic function according to at least one piece of device information corresponding to the target logic function. For example, if the model identifier information of the terminal device received by the terminal device is Xiaomi phone 3, the adaptation server may search the preset model adaptation database for the corresponding model adaptation information according to the reported model identifier information, and the terminal device obtains the model adaptation information returned by the adaptation server. If the target logic function is a video chat application, the terminal device may obtain at least one piece of device information corresponding to the video chat application from the model adaptation information according to the target logic function, where the device information may include camera information, video display format information, microphone information, receiver information, and the like, and then the terminal device runs the video chat application according to the device information.

In the client application adaptation method shown in FIG. 2, an adaptation server may obtain model identifier information of a terminal device in which a client application is located, search a preset model adaptation database for corresponding model adaptation information according to the model identifier information, and send the model adaptation information to the terminal device, so that the terminal device performs client application adaptation according to the real model adaptation information of the terminal device in which the client application is located, which is returned by the adaptation server, thereby improving reliability of the client application adaptation.

Figure 3:
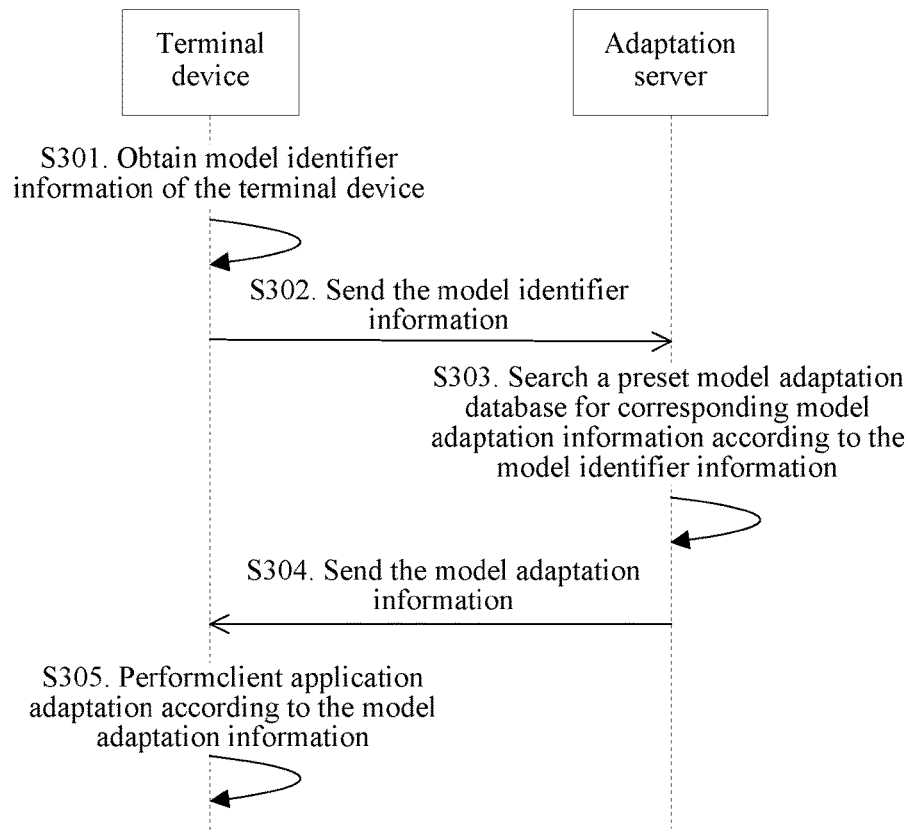
FIG. 3 is a flowchart of a client application adaptation method according to various embodiments of the present disclosure.

Referring to FIG. 3, FIG. 3 is a flowchart of a client application adaptation method according to various embodiments of the present disclosure. The method may include:

Step S301: Obtain model identifier information of a terminal device.

Step S302: Send the obtained model identifier information to an adaptation server.

Step S303: The adaptation server searches a preset model adaptation database for corresponding model adaptation information according to the model identifier information.

After receiving the model identifier information, the adaptation server may search the preset model adaptation database for the corresponding model adaptation information according to the model identifier information.

Step S304: The adaptation server sends the found model adaptation information to the terminal device.

Step S305: The terminal device performs adaptation on a client application in the terminal device according to the model adaptation information.

Figure 4:
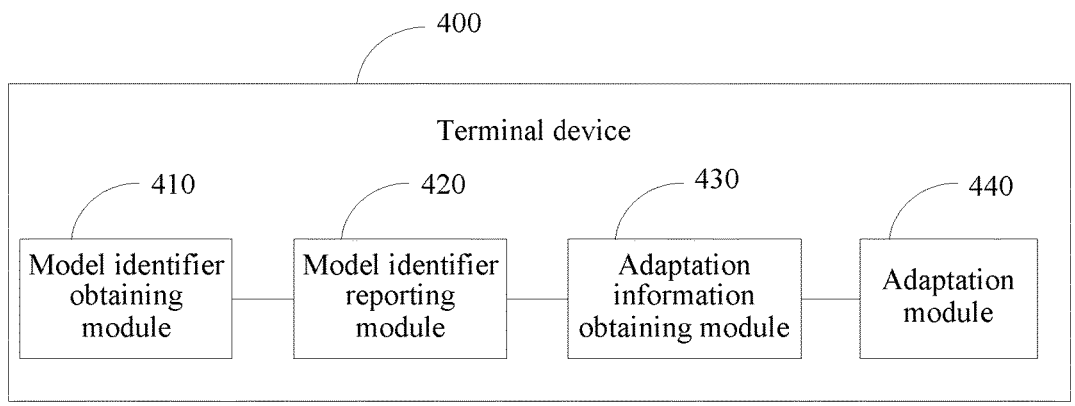
FIG. 4 is a structural diagram of a terminal device according to various embodiments of the present disclosure.

Referring to FIG. 4, FIG. 4 is a structural diagram of a terminal device 400 according to various embodiments of the present disclosure. As shown in the figure, the terminal device 400 in various embodiments may include at least a model identifier obtaining module 410, a model identifier reporting module 420, an adaptation information obtaining module 430, and an adaptation module 440.

The model identifier obtaining module 410 obtains model identifier information of a terminal device, where the model identifier information of the terminal device may include information such as a brand identifier and model identifier, where the brand identifier may include Samsung, Apple, Xiaomi, Coolpad, or the like, and the model identifier may include GT-i8552, iPhone 5S, Xiaomi phone 3, Coolpad 7260, or the like. The model identifier obtaining module 410 may invoke configuration information of the terminal device, and obtain the model identifier information of the terminal device from the configuration information. In various embodiments, alternatively the model identifier obtaining module 410 may obtain the model identifier information of the terminal device according to a link address of the terminal device; or the model identifier obtaining module 410 may obtain the model identifier information of the terminal device in another implementation manner, which specifically is not limited by various embodiments of the present disclosure.

The model identifier reporting module 420 sends the model identifier information to an adaptation server, so that the adaptation server searches a preset model adaptation database for corresponding model adaptation information according to the model identifier information.

The adaptation server may store model identifier information of terminal devices and model adaptation information corresponding to the model identifier information that are collected in advance into the preset model adaptation database. Specifically, a developer may perform the collection for real devices in advance, that is, collect model identifier information of the real devices and model adaptation information corresponding to the model identifier information in advance; the adaptation server may correspondingly store the model identifier information and the model adaptation information that are collected by the developer in advance into the preset model adaptation database; and then the model identifier reporting module 420 sends the model identifier information to the adaptation server, so that the adaptation server searches the preset model adaptation database for the model adaptation information corresponding to the received model identifier information, where the model adaptation information may include information such as hardware status and a system support parameter of the terminal device corresponding to the received model identifier information, where the hardware status of the terminal device may include information about a display screen, a camera, a microphone, a receiver, or the like, and the system support parameter of the terminal device may include information such as a network mode, an operating system, a video display format, or a display screen resolution.

The adaptation information obtaining module 430 obtains the model adaptation information returned by the adaptation server. For example, if the model identifier information of the terminal device obtained by the model identifier obtaining module 410 is Xiaomi phone 3, after the model identifier reporting module 420 sends the model identifier information to the adaptation server, the adaptation server searches the preset model adaptation database for corresponding model adaptation information according to the model identifier information, where the model adaptation information returned by the adaptation server, which is obtained by the adaptation information obtaining module 430, may include information such as dual cameras, an operating system MIUI, a display screen 5.0-inch, and a video display format 1080P.

The adaptation module 440 performs client application adaptation according to the model adaptation information returned by the adaptation server, where the adaptation module 440 may perform, in a development process of an APP application, an adaptation test in a real environment by using different types of terminal devices; and optionally, before a target terminal device is installed or the APP application is used, the adaptation module 440 may further perform client application adaptation according to real model adaptation information of the target terminal device which is returned by the adaptation server.

In an optional embodiment, the adaptation module 440 executes a preset logic function according to the model adaptation information, where the preset logic function may include a video chat application, an image and video application, a game voice application, and the like.

Figure 5:
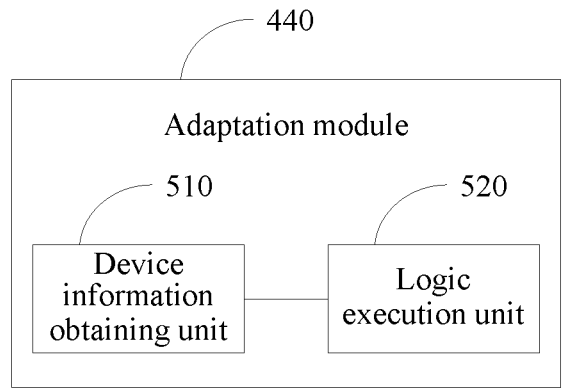
FIG. 5 is a structural diagram of an adaptation module in FIG. 4 according to various embodiments of the present disclosure.

In an optional embodiment, the model adaptation information includes multiple pieces of device information of the terminal device 400, and then as shown in FIG. 5, the adaptation module 440 in various embodiments of the present disclosure may further include:

a device information obtaining unit 510 to obtain, according to a target logic function, at least one piece of device information corresponding to the target logic function from the model adaptation information, where the model adaptation information may include device information such as camera information, video display format information, microphone information, and receiver information; and a logic execution unit 520 to execute the target logic function according to the at least one piece of device information corresponding to the target logic function.

In an optional embodiment, an adaptation developer may run multiple preset target logic functions in the terminal device 400 according to the model adaptation information, thereby obtaining an adaptation test result of a program for the preset target logic functions in a terminal device in which the program is currently located. For example, the model identifier reporting module 420 sends the model identifier information of the terminal device obtained by the model identifier obtaining module 410 to the adaptation server, then the adaptation server may search the preset model adaptation database for the corresponding model adaptation information according to the model identifier information, and the adaptation information obtaining module 430 obtains the model adaptation information returned by the adaptation server. If the target logic function is a video chat application, the device information obtaining unit 510 may obtain at least one piece of device information corresponding to the video chat application from the model adaptation information returned by the adaptation server, and then the logic execution unit 520 may run the video chat application according to the device information, and obtain an adaptation test result of a program for the video chat application in a terminal device in which the program is currently located.

However, in another optional embodiment, the foregoing procedure may also be executed in an installation process of the terminal device 400, to implement client application adaptation of the terminal device 400, to ensure that, when being used, the terminal device 400 uses real model adaptation information of the terminal device in a process of executing a target logic function. For example, the model identifier reporting module 420 sends the model identifier information obtained by the model identifier obtaining module 410 to an adaptation server, then the adaptation server may search the preset model adaptation database for the corresponding model adaptation information according to the model identifier information, and the adaptation information obtaining module 430 obtains the real model adaptation information of the terminal device in which a client application is located, which is returned by the adaptation server. If the target logic function executed by the terminal device 400 when being used is a video chat application, the device information obtaining unit 510 may obtain at least one piece of device information corresponding to the video chat application from the real model adaptation information of the terminal device 400 returned by the adaptation server, and then the logic execution unit 520 may run the video chat application according to the device information, to implement the client application adaptation of the terminal device.

In the terminal device shown in FIG. 4 and FIG. 5, a model identifier reporting module 420 sends model identifier information of a terminal device obtained by a model identifier obtaining module 410 to an adaptation server, so that the adaptation server searches a preset model adaptation database for corresponding model adaptation information according to the model identifier information, an adaptation information obtaining module 430 obtains the model adaptation information returned by the adaptation server, and an adaptation module 440 performs client application adaptation according to the real model adaptation information of the terminal device 400 returned by the adaptation server, thereby improving reliability of the client application adaptation.

Figure 6:
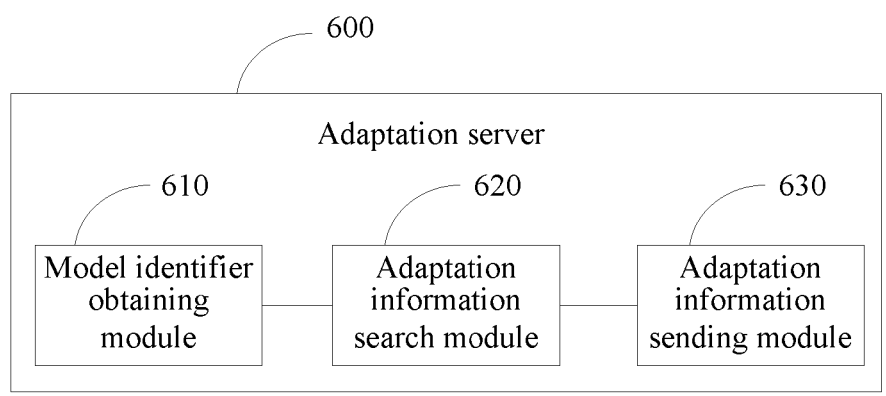
FIG. 6 is a structural diagram of an adaptation server according to various embodiments of the present disclosure.

Referring to FIG. 6, FIG. 6 is a structural diagram of an adaptation server 600 according to various embodiments of the present disclosure. As shown in the figure, the adaptation server 600 in various embodiments may include at least a model identifier obtaining module 610, an adaptation information search module 620, and an adaptation information sending module 630.

The model identifier obtaining module 610 obtains model identifier information of a terminal device in which a client application is located, where the model identifier information of the terminal device may include information such as a brand identifier and model identifier, where the brand identifier may include Samsung™, Apple™, Xiaomi™, Coolpad™, or the like, and the model identifier may include GT-i8552, iPhone 5S, Xiaomi phone 3, Coolpad 7260, or the like.

The adaptation information search module 620 searches a preset model adaptation database for corresponding model adaptation information according to the model identifier information.

The adaptation server 600 may store model identifier information of terminal devices and model adaptation information corresponding to the model identifier information that is collected in advance into the preset model adaptation database. Specifically, a developer may perform the collection for real devices in advance, that is, collect model identifier information of the real devices and model adaptation information corresponding to the model identifier information in advance; the adaptation server 600 may correspondingly store the model identifier information and the model adaptation information that are collected by the developer in advance into the preset model adaptation database; and then after the model identifier obtaining module 610 obtains the model identifier information sent by the terminal device, the adaptation information search module 620 may search the preset model adaptation database for the model adaptation information corresponding to the received model identifier information, where the model adaptation information may include information such as hardware status and a system support parameter of the terminal device corresponding to the received model identifier information, where the hardware status of the terminal device may include information about a display screen, a camera, a microphone, a receiver, or the like, and the system support parameter of the terminal device may include information such as a network mode, an operating system, a video display format, or a display screen resolution.

The adaptation information sending module 630 sends the model adaptation information to the terminal device, so that the terminal device performs adaptation on the client application in the terminal device according to the model adaptation information returned by the adaptation server. For example, if the model identifier information of the terminal device obtained by the model identifier obtaining module 610 is Xiaomi phone 3, the adaptation information search module 620 searches the preset model adaptation database for model adaptation information corresponding to the model identifier information, where the model adaptation information may include information such as dual cameras, an operating system MIUI, a display screen 5.0-inch, and a video display format 1080P; and the adaptation information sending module 630 may send the found model adaptation information to the terminal device, so that the terminal device performs adaptation on the client application in the terminal device according to the model adaptation information returned by the adaptation server.

Specifically, the adaptation information sending module 630 sends the model adaptation information to the terminal device, so that the terminal device executes a preset logic function according to the model adaptation information returned by the adaptation server, where the preset logic function may include a video chat application, an image and video application, a game voice application, and the like, and further the model adaptation information may include multiple pieces of device information of the terminal device, for example, camera information, video display format information, microphone information, and receiver information; and the terminal device may obtain, according to a target logic function, at least one piece of device information corresponding to the target logic function from the model adaptation information sent by the adaptation information sending module 630, and execute the target logic function according to the at least one piece of device information corresponding to the target logic function. For example, if the model identifier information of the terminal device received by the terminal device is Xiaomi phone 3, the adaptation information search module 620 may search the preset model adaptation database for the corresponding model adaptation information according to the reported model identifier information, and the adaptation information sending module 630 sends the model adaptation information to the terminal device. If the target logic function is a video chat application, the terminal device may obtain at least one piece of device information corresponding to the video chat application from the model adaptation information according to the target logic function, where the device information may include camera information, video display format information, microphone information, receiver information, and the like, and then the terminal device runs the video chat application according to the device information.

In the adaptation server shown in FIG. 6, a model identifier obtaining module 610 obtains model identifier information of a terminal device reported by the terminal device, an adaptation information search module 620 searches a preset model adaptation database for corresponding model adaptation information according to the model identifier information, and an adaptation information sending module 630 sends the model adaptation information to the terminal device, so that the terminal device performs adaptation on a client application in the terminal device according to the real model adaptation information of the terminal device, thereby improving reliability of client application adaptation.

Figure 7:
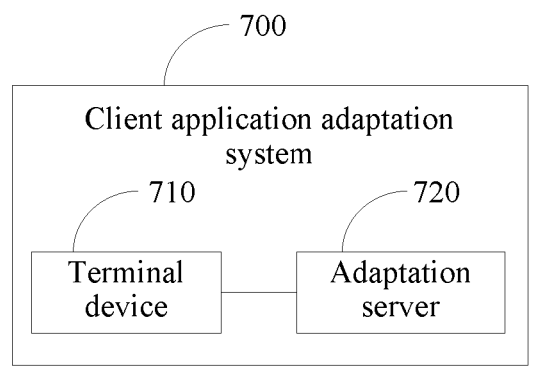
FIG. 7 is a structural diagram of a client application adaptation system according to various embodiments of the present disclosure.

Referring to FIG. 7, FIG. 7 is a structural diagram of a client application adaptation system 700 according to various embodiments of the present disclosure. As shown in the figure, the client application adaptation system 700 in various embodiments may include a terminal device 710 and an adaptation server 720, where for the terminal device 710, reference may be made to the terminal device shown in FIG. 4 and FIG. 5, and for the adaptation server 720, reference may be made to the adaptation server in FIG. 6.

The terminal device 710 obtains model identifier information of a terminal device, and send the model identifier information to the adaptation server 720, where the model identifier information of the terminal device may include information such as a brand identifier and model identifier, where the brand identifier may include Samsung™, Apple™, Xiaomi™, Coolpad™, or the like, and the model identifier may include GT-i8552, iPhone 5S, Xiaomi phone 3, Coolpad 7260, or the like. Optionally, the terminal device 710 may invoke terminal identifier information of the terminal device, and obtain the model identifier information of the terminal device from the terminal identifier information.

The adaptation server 720 searches a preset model adaptation database for corresponding model adaptation information according to the model identifier information, and returns the model adaptation information to the terminal device 710.

The adaptation server 720 may store model identifier information of terminal devices and model adaptation information corresponding to the model identifier information that is collected in advance into the preset model adaptation database. Specifically, a developer may perform the collection for real devices in advance, that is, collect model identifier information of the real devices and model adaptation information corresponding to the model identifier information in advance; the adaptation server 720 may correspondingly store the model identifier information and the model adaptation information that are collected by the developer in advance into the preset model adaptation database; and then after a terminal device 710 sends the model identifier information to the adaptation server 720, the adaptation server 720 may search the preset model adaptation database for the model adaptation information corresponding to the received model identifier information, where the model adaptation information may include information such as hardware status and a system support parameter of the terminal device corresponding to the received model identifier information, where the hardware status of the terminal device may include information about a display screen, a camera, a microphone, a receiver, or the like, and the system support parameter of the terminal device may include information such as a network mode, an operating system, a video display format, or a display screen resolution. For example, if the model identifier information of the terminal device obtained by the terminal device 710 is Xiaomi phone 3, the terminal device 710 sends the model identifier information to the adaptation server 720, the adaptation server 720 searches the preset model adaptation database for model adaptation information corresponding to the model identifier information, where the model adaptation information may include information such as dual cameras, an operating system MIUI, a display screen 5.0-inch, and a video display format 1080P, and the adaptation server 720 sends the model adaptation information to the terminal device.

The adaptation module 710 further performs adaptation on a client application in the terminal device according to the model adaptation information returned by the adaptation server 720, where the terminal device 710 may perform, in a development process of an APP application, an adaptation test in a real environment by using different types of terminal devices; and optionally, before a target terminal device is installed or the APP application is used, the terminal device 710 may further perform adaptation on the client application in the terminal device according to the real model adaptation information of the target terminal device returned by the adaptation server 720.

In an optional embodiment, that the terminal device 710 performs adaptation on the client application in the terminal device according to the model adaptation information returned by the adaptation server may specifically include that:

the terminal device 710 executes a preset logic function according to the model adaptation information, where the preset logic function may include a video chat application, an image and video application, a game voice application, and the like.

In an optional embodiment, the model adaptation information may include multiple pieces of device information of the terminal device 710, for example, camera information, video display format information, microphone information, and receiver information.

Further, that the terminal device 710 executes a preset logic function according to the model adaptation information may specifically include:

the terminal device 710 obtains, according to a target logic function, at least one piece of device information corresponding to the target logic function from the model adaptation information.

The terminal device 710 executes the target logic function according to the at least one piece of device information corresponding to the target logic function.

In an optional embodiment, an adaptation developer may run multiple preset target logic functions in the terminal device 710 according to the model adaptation information, thereby obtaining an adaptation test result of a program for the preset target logic functions in a terminal device in which the program is currently located. For example, if the model identifier information of the terminal device obtained by the terminal device 710 is Xiaomi phone 3, and the terminal device 710 sends the model identifier information to the adaptation server 720, the adaptation server 720 may search the preset model adaptation database for corresponding model adaptation information according to the model identifier information, and the terminal device 710 obtains the model adaptation information returned by the adaptation server 720. If the target logic function is a video chat application, the terminal device 710 may obtain at least one piece of device information corresponding to the video chat application from the model adaptation information returned by the adaptation server 720, where the device information may include camera information, video display format information, microphone information, receiver information, and the like, and then the terminal device 710 runs the video chat application according to the device information, and obtains an adaptation test result of a program for the video chat application in a terminal device in which the program is currently located.

However, in another optional embodiment, the foregoing procedure may also be executed in an installation process of the terminal device 710, to implement client application adaptation of the terminal device 710, to ensure that, when being used, the terminal device 710 uses real model adaptation information of the terminal device in a process of executing a target logic function. For example, if, in the installation process of the terminal device 710, the model identifier information of the terminal device obtained by the terminal device 710 is Xiaomi phone 3, and the terminal device 710 sends the model identifier information to the adaptation server 720, the adaptation server 720 may search the preset model adaptation database for the corresponding model adaptation information according to the model identifier information, and the terminal device 710 obtains the real model adaptation information of the terminal device 710 returned by the adaptation server 720. If the target logic function executed by the terminal device 710 when being used is a video chat application, the terminal device 710 may obtain at least one piece of device information corresponding to the video chat application from the real model adaptation information of the terminal device 710 returned by the adaptation server 720, where the device information may include camera information, video display format information, microphone information, receiver information, and the like, and then the terminal device 710 may run the video chat application according to the device information, to implement the client application adaptation of the terminal device 710.

In the client application adaptation system shown in FIG. 7, an adaptation server 720 searches a preset model adaptation database for corresponding model adaptation information according to model identifier information sent by a terminal device 710, and returns the model adaptation information to the terminal device 710, and then the terminal device 710 performs adaptation on a client application in the terminal device according to the real model adaptation information of the terminal device 710 returned by the adaptation server 720, thereby improving reliability of client application adaptation.

A person of ordinary skill in the art may understand that all or some of the procedures of the method embodiments may be implemented by a computer program instructing relevant hardware. The program may be stored in a computer readable storage medium, and run by one or more processors. When running, the program may include the procedures of the method embodiments. The storage medium may be a magnetic disk, an optical disc, a read-only memory (ROM), a random access memory (RAM), or the like.

Disclosed foregoing is only embodiments of the present disclosure, and certainly may not limit a rights scope of the present disclosure. Therefore, equivalent changes made according to claims of the present disclosure still fall within a scope covered by the present disclosure.

The invention claimed is:

1. A client application adaptation method, comprising:
at a terminal device having one or more processors and memory storing programs executed by the one or more processors:
obtaining model identifier information of the terminal device;
sending the model identifier information to an adaptation server for the adaptation server searching a preset model adaptation database for corresponding model adaptation information according to the model identifier information;
receiving the model adaptation information returned by the adaptation server, wherein the model adaptation information comprises multiple pieces of device information of the terminal device in which a client application is located;
obtaining, according to a target logic function of the client application which includes at least one of a video chat function, an image and video function, or a game voice function, at least one piece of device information corresponding to the target logic function from the model adaptation information; and
executing the target logic function on the client application according to the at least one piece of device information corresponding to the target logic function.

2. A terminal device, comprising:
one or more processors;
memory; and
one or more program modules stored in the memory and executed by the one or more processors, the one or more program modules comprising:
a model identifier obtaining module obtaining model identifier information of the terminal device;
a model identifier reporting module sending the model identifier information to an adaptation server, so that the adaptation server searches a preset model adaptation database for corresponding model adaptation information according to the model identifier information;
an adaptation information obtaining module receiving the model adaptation information returned by the adaptation server, wherein the model adaptation information comprises multiple pieces of device information of the terminal device in which the client application is located; and
an adaptation module comprising: a device information obtaining unit obtaining, according to a target logic function of the client application which includes at least one of a video chat function, an image and video function, or a game voice function, at least one piece of device information corresponding to the target logic function from the model adaptation information; and a logic execution unit executing the target logic function on the client application according to the at least one piece of device information corresponding to the target logic function.

3. A client application adaptation system, comprising an adaptation server and at least one terminal device:
the terminal device obtaining model identifier information of the terminal device, and sending the model identifier information to the adaptation server;
the adaptation server searching a preset model adaptation database for corresponding model adaptation information according to the model identifier information, and return the model adaptation information to the terminal device, wherein the model adaptation information comprises multiple pieces of device information of the terminal device in which the client application is located; and
the terminal device further obtaining, according to a target logic function of the client application which includes at least one of a video chat function, an image and video function, or a game voice function, at least one piece of device information corresponding to the target logic function from the model adaptation information; and
executing the target logic function on the client application according to the at least one piece of device information corresponding to the target logic function.

4. The system according to claim 3, wherein the adaptation server comprises:
one or more processors;
memory; and
one or more program modules stored in the memory and executed by the one or more processors, the one or more program modules comprising:
a model identifier obtaining module obtaining model identifier information of a terminal device in which a client application is located;
an adaptation information search module searching a preset model adaptation database for corresponding model adaptation information according to the model identifier information; and
an adaptation information sending module sending the model adaptation information to the terminal device for the terminal device performing adaptation on the client application according to the model adaptation information.

5. The system according to claim 4, wherein the model identifier information of the terminal device comprises a brand identifier and model identifier.

6. The system according to claim 4, wherein the adaptation server further stores the model identifier information and the model adaptation information that are collected by a developer in advance into the preset model adaptation database.

* * * * *